Oct. 24, 1944.    H. B. DENMAN    2,360,830
GASKET
Filed Feb. 6, 1942

Inventor:
Harry B. Denman,
By Cushman Darby and Cushman
Attorneys.

Patented Oct. 24, 1944

2,360,830

UNITED STATES PATENT OFFICE 2,360,830

GASKET

Harry B. Denman, Detroit, Mich., assignor to Detroit Gasket & Manufacturing Company, Detroit, Mich., a corporation of Michigan Application February 6, 1942, Serial No. 429,815

1 Claim. (Cl. 288—33)

The present invention relates to gaskets particularly useful as oil seals and grease retainers, and methods of making gaskets.

At the present time such gaskets are constructed of leather or synthetic rubbers and in some instances, have fabric inserts. Leather or fabrics are frequently affected by heat, becoming hard and brittle so as to render the seal unfit for service. In many of such constructions, a metal ring or spring is incorporated to give added strength and prevent the seal from swelling away from the shaft due to distortion of the material by the oils or greases with which the gasket is in contact.

The primary object of the present invention is to provide gaskets, for instance, ring-shaped seals, which are formed as self-sustaining flexible and resilient bodies from felted sheet material made of glass fibers and saturated with a sealing binder.

Another object of the invention is to provide a gasket formed of felted sheet material made of glass fibres which possesses enhanced compressibility and resilience but of particular importance exhibits a marked resistance to extensibility or elongation i. e., is not swelled by the action of greases, oils, water and solvents and does not flow out when compressed between joint surfaces.

A further object of the invention is to provide a self-sustaining inextensible gasket which does not require a fibre insert or retaining means such as a metallic ring or spring, although it may be used with such latter structures as a replacement.

It is, moreover, an object of the invention to provide a gasket which does not dry out or harden in use or in presence of elevated temperatures.

An additional object of the invention is to provide a gasket which has a sealing life under frictional engagement with a rotating shaft much longer than many available products.

Of equal importance with the foregoing, it is an object of the invention to provide an improved method of forming gaskets having a coil structure by which method gaskets of any required thickness and flange dimension may be produced from felted sheet material of glass fibres, e. g., gaskets having a flange width narrower than the thickness of the gaskets.

While I have disclosed and will describe hereinafter a ring gasket prepared by winding a continuous length of saturated and coated, felted sheet material formed of glass fibres, it is to be understood that gaskets may be punched out from the flat felted saturated sheet material where required and provide seals or rings which are highly efficient and have the advantages above set forth.

Referring to the drawing.

Figure 1:
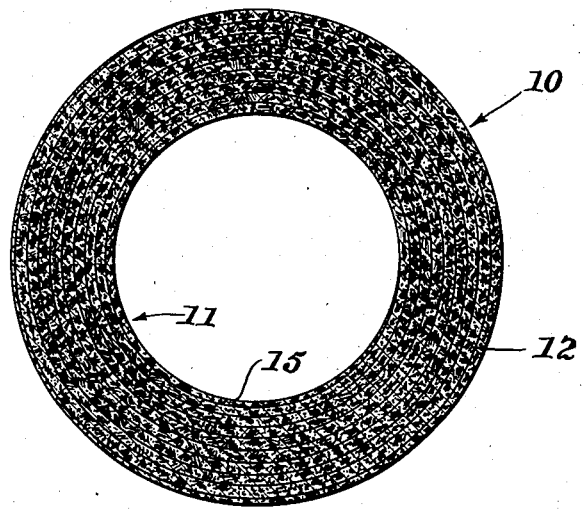
Figure 1 is a sectional view of a preferred form of gasket.

In the drawing, I have shown a ring type of gasket at 10, but it is to be understood that gaskets of any required shape may be made according to this invention.

In carrying out the invention, the felted sheet material is prepared by felting glass fibres according to any of the usual felting procedures into a matted substantially inextensible sheet structure, usually with the employment of pressure.

The structure of the inextensible sheet is to be distinguished from textile fabrics e. g., of the woven or knitted type which I find are not as efficient for gasket purposes as a sheet prepared by felting glass fibres into a matted sheet.

The flexible self-sustaining sheet material of any required thickness then preferably has its pores sealed and the matted fibres thereof bonded together by impregnating or saturating with a suitable sealing binder after which the coated and saturated web may be further pressed as by rolling if desired.

The sealing binder is preferably a solution or dispersion of synthetic rubbers or flexible synthetic resins and in some cases natural rubber or flexible glues may be employed. The saturation is carried out in any suitable manner as by immersing the matted web in a bath of the sealing binder or by spreading or spraying the same upon the felted sheet so as to incorporate an amount of the sealing binder effective to seal the web and bond the fibres. The amount of binder present is insufficient to change the inextensible characteristic of the felted web under the conditions encountered in the use of gaskets made therefrom.

The binders are commercially available and are preferably of the thermosetting type but thermoplastic materials may be used which are also heat-hardened. In the case of natural rubber or rubber substitutes, vulcanizing agents are frequently included which act to vulcanize the composition usually upon heating. The glues, for example, hide glue may be tanned with tanning agents such as formaldehyde. The important consideration is to employ a sealing binder which will enhance the non-extensibility of the web and which does not dry out to brittlize or shrink the web, and which at the same time will saturate and coat the matted fibres of the felted sheet so as to seal the pores thereof and bind the fibres together. Thereby, an integral, preferably flexible, leak-proof, self-sustaining and inextensible structure is formed which has a long life. The sealing binder as indicated is of the type which on setting, is unaffected by elevated temperatures or by the action of oils, greases, solvents and water. In addition, it is preferred to use a sealing binder which will impart flexibility to the sheet and which will either enhance its resilience or will not impair the inherent resilience of the matted structure. The sealing binder as stated also coats the surface of the matted web and this is desirable when making a coiled structure since the adhesive coating will bind the convolutions under the action of pressure or elevated temperatures, or both, to form an integral coiled structure in which the convolutions of the coated and saturated continuous web are tightly adhered together.

Referring to Figure 1, there is illustrated such a convolute integral structure in the form of the ring or bearing seal 10, which provides a satisfactory oil seal or grease retainer. This ring is resilient and flexible and self-sustaining, so that it requires no fabric inserts or metallic supporting means. Of particular significance, it is inextensible, i. e., does not expand or swell in the presence of solvents, greases, oils and water or flow under high sealing pressures. This quality of inextensibility assures that the gasket will form a tight seal under the most exacting requirements and the resilience and permanence of the structure assures that it will closely fit the shaft and be resiliently maintained in contact therewith for an extended period of time.

Figure 2:
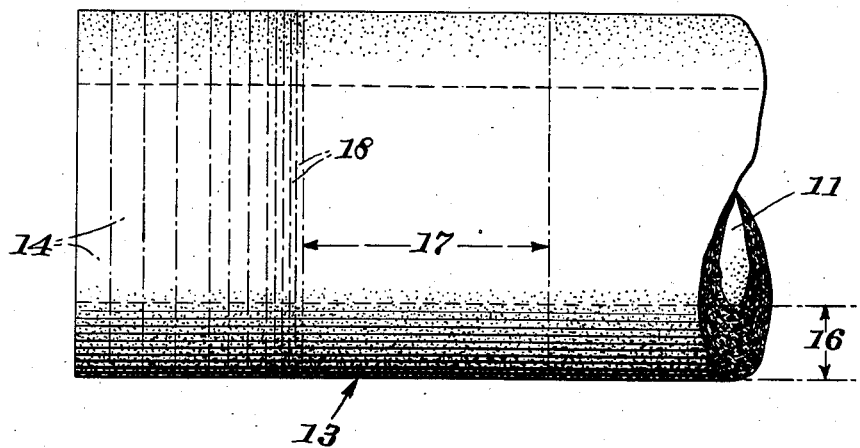
Figure 2 is a plan view of a tube of the convoluted saturated sheet felted from glass fibres and from which gaskets or rings of any desired thickness and flange width may be sliced.

Referring to Figure 2, the felted saturated sheet of glass fibres having a coating of the sealing binder thereon is tightly wound upon a mandrel having an outside diameter equal to the inside diameter of the gasket opening 11 and the convolutions of the continuous sheet are built up into a tube 13 of a thickness slightly greater than the desired flange width. Then, the coil or laminated tube on the mandrel is wrapped with cloth tape or placed in a mould to compress the plies or convolutions into intimate contact, and subjected to heat where necessary to set the binder securely. After removal from the mould or after removing the wrapper following setting of the binder, the assembly is ground to smooth the outside and to insure an accurate flange dimension. The tube 13 thus formed is placed in a lathe of any suitable character and as the same is rotated, rings 14 of any desired thickness are cut with a conventional type of knife. In this manner, each gasket will conform to the exact size and contour of a bearing and the wall 15 of the gasket opening 11 will be smooth and the opening will be of a size that a shaft will exactly fit therein.

As explained above, the invention makes it practical to cut a gasket having a flange width narrower than the thickness of the gasket, e. g., a ring seal having a flange width 16 of ⅛ inch and length 17 of several inches can be produced by this method, the showing in Figure 2 being exaggerated for purposes of illustration. Likewise, the gasket width 16 may be substantially greater than the narrow gasket length 18, as also illustrated in Figure 2.

The bearing seal shown in Figure 1 is a substantially integral structure, the sealing binder 12 on the surface of the continuous felted saturated sheet being in the form of a relatively thin film and being present in amount effective to bind the convolutions together. Close inspection is necessary to detect the convolute or coil character of the gasket, because the convolutions of the continuous sheet are so intimately associated with each other. The important advantage which the invention possesses, aside from resiliency and flexibility, is its marked inextensibility under the most severe conditions of exposure to greases, oils, solvents and water, high sealing pressures and high temperatures. The gasket will conform to the shape and exact size of a bearing and will permanently prevent leakage for a much longer time than many more expensive products now available.

The saturated sheet material may have gaskets severed or punched therefrom which will afford self-sustaining inextensible seals in cases where a coiled structure is not desirable, although it is preferred to form the gasket as a coiled integral structure.

Improved bearing seal gaskets may be prepared as described herein without saturating the web, but is is preferred to use the sealing binder for this purpose. Where the unsaturated sheet material is to be used for making a coiled structure, an adhesive coating may be applied to the surface thereof.

While I have referred to the sealing binder as being the saturant as well as the adhesive for uniting the convolutions, it is to be understood that the felted web may be saturated with one material which is then set whereupon the sheet material, for the purpose for making a coiled type of gasket, may be coated with an adhesive which may be the same or a different sealing binder to adhere the convolutions together.

Also, while I have referred to ring seals or gaskets, the saturated or coated fibrous material may be molded to form U-shaped or similar irregular or arc-shaped gaskets or split gaskets. Thus molded articles of substantially U or any other shape may be produced by suitably cutting the mandrel wrapped or otherwise molded material in the tube form or as rings or the rings produced from the flat sheet. Preferably this is done before the binder is set, and thereafter the U or otherwise shaped molded products are treated to set or vulcanize the binder usually under pressure as described.

I claim:

An annular gasket comprising a spirally arranged continuous strip of inextensible felted glass fibres, a flexible sealing binder incorporated in said strip throughout its thickness to seal the pores thereof and bond the fibres together, the sealing binder incorporated strip retaining its inextensible characteristic, a surface coating of the sealing binder on each side of said strip, the sealing binder on the surfaces of the strip being disposed between the abutting surfaces of the convolutions for adhering the convolutions together into a substantially integral structure characterized by compressibility and resilience, the sealing binder forming a relatively thin film between the convolutions of the gasket and being in amount effective to bind the convolutions together.

HARRY B. DENMAN.